United States Patent [19]

Dosiere et al.

[11] Patent Number: 5,778,000
[45] Date of Patent: Jul. 7, 1998

[54] FRAME SYNCHRONIZATION METHOD

[75] Inventors: Philippe Richard Dosiere, Brussels; Jan Mennekens, Brasschaat; Geert Alfons Domien Sonck, Herdersem, all of Belgium; André Marguinaud, Palaiseau, France

[73] Assignee: Alcatel N.V., Rijswijk, Netherlands

[21] Appl. No.: 684,675

[22] Filed: Jul. 19, 1996

[30] Foreign Application Priority Data

Jul. 20, 1995 [EP] European Pat. Off. ............ 95202002

[51] Int. Cl.$^6$ .................................. H04J 3/06; H04L 7/04
[52] U.S. Cl. .......... 370/512; 370/509; 370/511; 371/5.4; 371/5.1
[58] Field of Search ................... 371/5.4, 37.7, 371/40.11, 42, 47.1, 27; 395/182.06; 375/368; 370/509, 511, 512

[56] References Cited

U.S. PATENT DOCUMENTS

| 4,247,945 | 1/1981 | Seibel ........................... 375/114 |
| 4,500,985 | 2/1985 | Chang ........................... 370/14 |
| 4,730,346 | 3/1988 | Jiang ............................ 375/368 |
| 4,847,877 | 7/1989 | Besseyre ....................... 375/368 |
| 5,081,654 | 1/1992 | Stephenson .................. 375/368 |
| 5,123,013 | 6/1992 | Hirayama ..................... 370/105.4 |
| 5,140,618 | 8/1992 | Kinoshita et al. ............. 375/368 |
| 5,430,746 | 7/1995 | Renz ............................ 371/47.1 |
| 5,459,754 | 10/1995 | Newby et al. ................ 375/368 |
| 5,509,036 | 4/1996 | Nakata ......................... 375/368 |
| 5,621,773 | 4/1997 | Varma et al. ................. 375/368 |
| 5,651,015 | 7/1997 | Bain ............................. 371/42 |
| 5,661,763 | 8/1997 | Sands .......................... 375/368 |
| 5,668,840 | 9/1997 | Takano ........................ 375/368 |

FOREIGN PATENT DOCUMENTS

| 0443376 | 8/1991 | European Pat. Off. . |
| 0652656 | 5/1995 | France . |

Primary Examiner—Ly Hua
Attorney, Agent, or Firm—Milton Oliver; Ware, Fressola, Van Der Sluys & Adolphson LLP

[57] ABSTRACT

A method for frame synchronization including the detection of an n-bit pattern with predetermined characteristics in a bitstream is described. The subject method includes the steps of extracting a first set of m bits, with m being smaller than or equal to n, from a first position in said bitstream, deriving from said first set an address of a location in a first memory, deriving from the contents of said location in said first memory at least one second position in said bitstream and at least one second set of bits to be extracted therefrom until said n-bit pattern is detected in said bitstream. An apparatus for performing the subject method is additionally described.

10 Claims, 4 Drawing Sheets

FIG. 1

| address | data |
|---------|------|
| 82B1 | FFFF |
| ACFF | 0001 |
| C1DA | FFFF |

FIG. 2a pointer: 0001

| field | data |
|-------|------|
| error count number | 0 |
| bit pointer | 4 |
| head mask pattern | 000F |
| head match pattern | 0001 |
| tail mask pattern | FFF0 |
| tail match pattern | C1D0 |
| marker | FFFF |

FIG. 2b

| address | data |
|---------|------|
| 821A | FFFF |
| FFFD | 0001 |
| 9DA1 | FFFF |

FIG. 3a

| pointer: | 0001 | 0002 |
|---|---|---|
| field | data | data |
| error count number | 2 | 2 |
| bit pointer | 12 | 8 |
| head mask pattern | 0FFF | 00FF |
| head match pattern | 01AC | 001A |
| tail mask pattern | F000 | FF00 |
| tail match pattern | D000 | 9D00 |
| marker | 0002 | FFFF |

FRAME SYNCHRONIZATION METHOD

TECHNICAL FIELD

The present invention relates to a frame synchronisation method including the detection of a n-bit pattern with predetermined characteristics in a bitstream.

BACKGROUND OF THE INVENTION

Such a frame synchronisation method is already known in the art, e.g. from EP 0443376 KINOSHITA et. al. Therein, the frame synchronisation is performed using dedicated hardware apparatus to detect the frame synchronisation word in the incoming serial bit stream. This is done by a first serial to parallel conversion of the incoming bitstream and by checking for the frame synchronisation word on a word by word basis, the words having a length equal to that of the frame synchronisation word, and the successive words to be compared with the synchronisation word being shifted in sequence by 1 bit. This approach however has the disadvantage that for each synchronisation protocol including the length of the synchronisation word, the synchronisation word bit values, dedicated hardware must be provided for performing the synchronisation, each time increasing the complexity of the system. Another drawback is that in case of simultaneous search operations for multiple synchronisation words, the hardware necessary for performing this multiple search constitutes a multiple of the hardware for performing the single search, again enhancing the total complexity. Especially in some space applications where it is not known a priori whether the incoming bitstream has to be considered in the forward or in the reverse direction, detection on two synchronisation words, the normal forward one, and the same one in the reverse direction, is of prime importance.

SUMMARY OF THE INVENTION

An object of the present invention is to provide a synchronisation method including the detection of a n-bit pattern with predetermined characteristics in a bitstream but which overcomes the above mentioned problems.

According to the invention, this object is achieved due to the fact that said method includes the steps of extracting a first set of m bits, with m being smaller than or equal to n, from a first position in said bitstream, deriving from said first set an address of a location in a first memory, deriving from the contents of said location in said first memory at least one second position in said bitstream and at least one second set of bits to be extracted therefrom until said n-bit pattern is detected in said bitstream.

In this way there is no need for dedicated hardware as in the known method, since all method steps can be executed by a computing apparatus that can receive an incoming bit stream, and perform some operations on these stored bits. Moreover the thus realized method can be used for all types of synchronisation words. A further advantage of such procedure is that further processing of the data contained in the incoming bitstream, once synchronisation is established, can be performed immediately on the same computer platform as the one supporting the computing apparatus.

Another characteristic feature of the present invention is that said m bits are consecutive bits of said bitstream, constituting a first m-bit set, and in that said first m-bit set forms part of said n-bit pattern if there exists at least one subset of m consecutive bits contained within said n-bit pattern for which a bit-by-bit comparison of said first m-bit set with said subset of m consecutive bits contained within said n-bit pattern does not result in a number of bit errors exceeding a predetermined number of bit errors, and that when said first m-bit set forms part of said n-bit pattern bits said contents of said location in said first memory includes a first pointer to a second memory location being a first entry of a linked list, said second memory location including information relative to the remaining n-m bits of the n-bit pattern to be detected into said bitstream, and that when said first m-bit set does not form part of said n-bit pattern said second position is equal to said first position in said bitstream shifted by maximum n−m+1 bits, and said steps as specified in claim 1 are repeated with said second position in said bitstream as said first position in said bitstream while said m bits are consecutive bits.

It has to be noted that a person skilled in the art could think of a software approach consisting of a direct mapping of the existing hardware methods for frame synchronisation into a software module. However this approach is slower than the subject method, if executed on the same computing apparatus. This is due to the fact that in the subject method the comparison of the incoming bitstream with the predetermined n-bit pattern occurs on groups of incoming bits which are shifted with respect to each other by up to n−m+1 bits. This is in contrast to the existing procedures that, although they may appear to consider groups of bits being different from each other by even a multiple of the number of bits contained in the synchronisation word, the latter operation is only performed in a first stage during the serial to parallel conversion of the incoming bitstream. During the subsequent comparison of the incoming bits with the n-bit frame synchronisation word subsequent groups of n-bit words, only differing from each other by only one subsequent bit are compared with the frame synchronisation word. By a proper choice of the value of m with respect to n, the subject method is however faster from a software point of view. This optimum m-value depends on the computing environment, and it will be obvious for a person skilled in the art, how to determine this value, after reading the remainder of this description.

Another characteristic feature of the invention is that said information includes a bit pointer indicating the relative position of said first m-bit set with respect to said n-bit pattern, and that said information further includes a first set of bit positions and a second set of bit positions and a first set of bit values and a second set of bit values, said first set of bit positions being a head mask pattern indicating which bit positions to verify in bits preceding said first m-bit set in said bitstream, said second set of bit positions being a tail mask pattern indicating which bit positions to verify in bits following said first m-bit set in said bitstream, said first set of bit values being a head match pattern and said second set of bit values being a tail match pattern and that said information further includes an error count number whose value is equal to the total number of bits not matching between said first m-bit set and said subset of m consecutive bits contained within said n-bit pattern, and further includes a marker whose value either has to be considered as a new pointer to a next memory location being a next entry in said linked list, or as an indication of the end of said linked list.

Yet another characteristic feature of the invention is that said information is used to calculate a head error being equal to the number of bits not matching between said head match pattern and bits in said bitstream corresponding to the positions as specified by the head mask pattern and to calculate a tail error being equal to the number of bits not matching between said tail match pattern and bits in said bitstream corresponding to the positions as specified by the tail mask pattern,and in that an updated error count number is calculated as said error count number incremented with said head error and said tail error; in case said updated error count number does not exceed said predetermined number of bit errors, said n-bit pattern is detected, in case said updated error count number exceeds said predetermined number of bit errors, the value of said marker is investigated whereby in case the value of said marker indicates the end of said linked list,the steps according to claim 1 are repeated while said first position in said bitstream is shifted by maximum n−m+1 bits and while said m bits are consecutive bits, and whereby in case the value of said marker is to be considered as a new pointer to a next memory location, said next memory location containing new information including a new bit pointer, at least one new set of bit positions including a new head mask pattern and a new tail mask pattern, at least one new set of bit values including a new head match pattern and a new tail match pattern, a new error count number and a new marker, the steps as mentioned in this paragraph then being repeated with said new error count number as said error count number, said new bit pointer as said bit pointer, said new set of bit positions as said set of bit positions, said new head mask pattern as said head mask pattern, said new tail mask pattern as said tail mask pattern, said new head match pattern as said head match pattern, said new tail match pattern as said tail match pattern and said new marker as said marker.

In this way the subject method also has the advantage of detecting synchronisation words, allowing a certain number of bit errors, requiring little extra effort. The linked list is sorted in such a way that the most probable bit occurrences are scanned first. In case the number of allowed bit errors changes, the linked list needs to be changed accordingly.

In this way it can also be understood that by using the subject method multiple synchronisation words can be searched concurrently at only minor extra expense, the latter being related to an increase of the number of locations contained within the first memory and an increase in the number of entries of the linked list. Nevertheless by careful structuring and sorting of the first memory and of the linked list, whereby the most probable bit occurrences need to be addressed and scanned first, the total elapsed time for searching is only slightly increased.

BRIEF DESCRIPTION OF THE DRAWINGS

The above mentioned and other objects and features of the invention will become more apparent and the invention itself will be best understood by referring to the following description taken in conjunction with the accompanying drawings wherein:

FIG. 1 represents a flowchart of the complete method according to the invention, and FIGS. 2a and 2b respectively represent part of the first memory contents and part of the linked list entries used in a first example on an incoming serial data stream containing an error-free synchronisation word, and FIGS. 3a and 3b respectively represent part of the first memory contents and part of the linked list entries used in a second example on an incoming serial data stream containing the synchronisation word in the presence of bit errors.

BEST MODE FOR CARRYING OUT THE INVENTION

Figure 1:
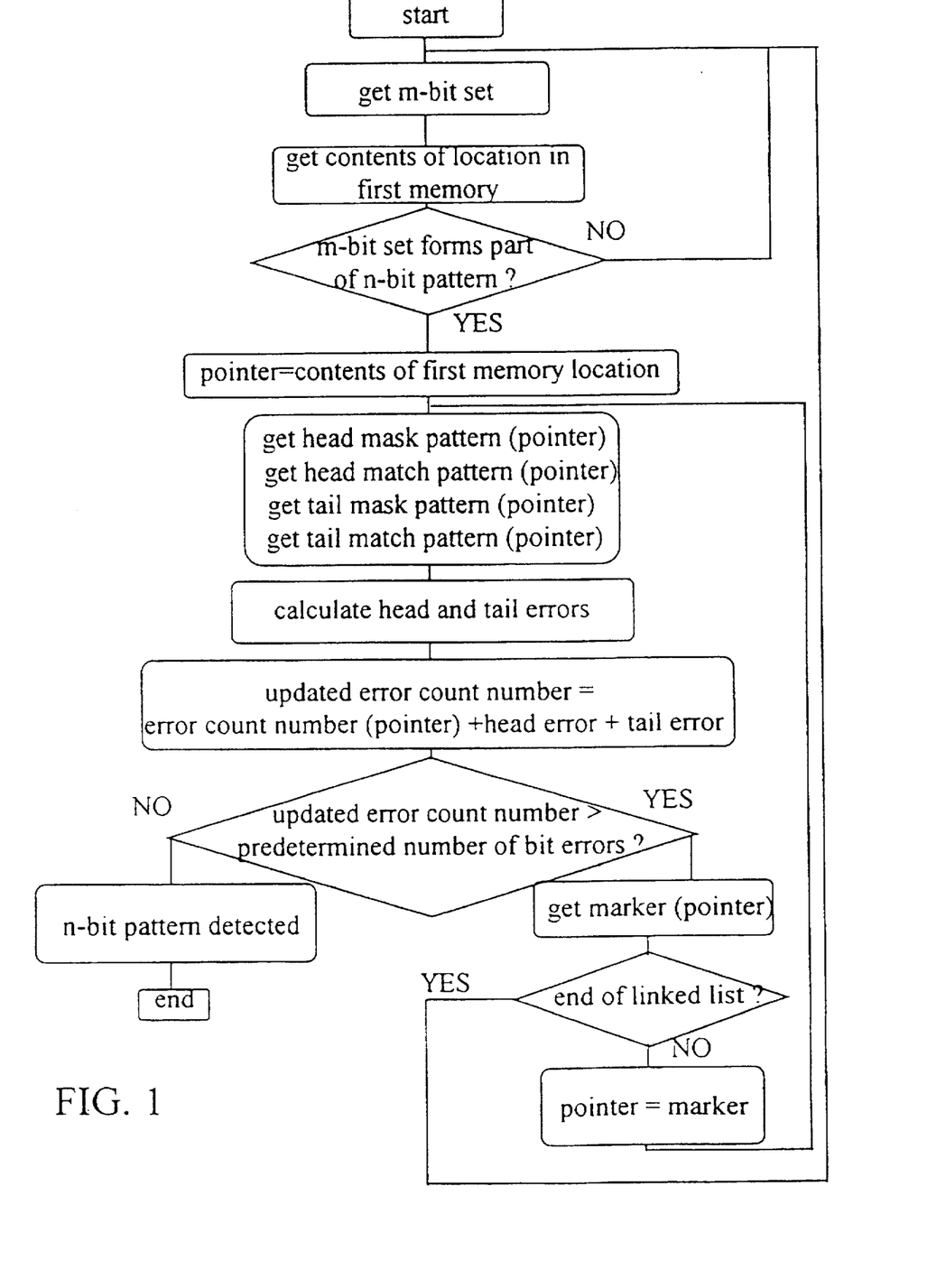

The subject method for frame synchronisation is used in space systems, more specifically in the applications based on the protocol recommended by the Consultative Committee for Space Data Systems. For these applications the synchronisation marker of the space missions is a 32 bit word. However, the subject method is also applicable to other lengths of synchronisation markers and will be explained in the general case of a n-bit synchronisation pattern. The flowchart of the complete method is represented in FIG. 1 and will be described more into detail in the next paragraphs. The flowchart of FIG. 1 consists of differently shaped boxes interconnected via horizontal as well as vertical lines. Via the lines a unique tree of successive steps is obtained. The branches of this tree are walked through from top to bottom. The actions which have to be executed successively are represented by rounded rectangle boxes. A diamond shaped box on the other hand indicates that one of two actions has to be executed. If a predetermined condition is fulfilled, the action or branch of actions connected to the diamond side marked by YES is executed. If this predetermined condition is not fulfilled, the action or branch of actions connected to the diamond side marked by NO is executed. The predetermined condition itself is described within the diamond shaped box.

The method whose steps are represented in the flow chart of FIG. 1 is performed on an incoming bitstream comprising the n-bit synchronisation pattern until this n-bit synchronisation pattern is detected. This incoming bitstream is received and temporarily stored in a register, using methods well known by a person skilled in the art and which will therefore not be described here. It is noted that in a more general case these m bits do not have to be successive, but may be in an arbitrary order, chosen by the method. In order to simplify the explanation, we will consider the case of m consecutive bits in this description. For a person skilled in the art, it will be obvious how to extrapolate the hereafter described method for m consecutive bits to the more complex case of m bits at an arbitrary, yet predetermined, position. Therefore the latter method will not be described into detail.

In the former method a first set of m consecutive bits, hereafter mentioned as first m-bit set, is extracted from the incoming data stream, starting at a first, arbitrarily chosen, position in this bitstream. This first position is indicated by the value of a bitstream position pointer. The value of this bitstream position pointer is initialized at the start of the method and will eventually be further updated as will become clear from the remainder of this description.

This first m-bit set is then considered as the address of a location in a first memory, this first memory constituting a table having $2^m$ memory locations or entries, whereby $2^m$ denotes the m-th power of 2. The basic principle of the method is that each of these $2^m$ table entries contains information with respect to the next set of bits to be searched for in the bitstream in order to find the complete n-bit pattern. This information is a bit word, its value being dependent upon whether the considered first m-bit set forms part of the n-bit pattern or not. An m-bit set is considered to form part of the n-bit pattern if there is at least one subset of m consecutive bits contained within the n-bit pattern on which a bit-by bit comparison of this m-bit set with that m-bit subset does not exceed a predetermined number of bit errors. In case all bit-by-bit comparisons of all possible subsets of m consecutive bits contained within the n-bit pattern with the m-bit set exceed this predetermined number of bit errors, the m-bit set is considered not to form part of this n-bit pattern. In the latter case the information contained within the first memory location of the table is a predetermined word, which is used to increment the value of the bitstream position pointer with maximum n−m+1. A new set of m consecutive bits starting at the position indicated by the updated value of the bitstream position pointer is then extracted. This new m-bit set is treated the same way as the first one and the procedure is repeated by considering this m-bit set again as an address of a memory location in the table.

This maximum value for incrementing the bitstream position pointer, n−m+1, can be understood based on the following extreme case wherein the initialized value of the bitstream position pointer is equal to b, and the n-bit pattern is situated between positions b+1 and b+n+1. The first m-bit set, starting at position b obviously does not form a part of the n-bit pattern, therefore a new set of m bits has to be extracted from a position having at least an overlap of m bits with the n-bit pattern. Therefore it should start at a position indicated by a value of the bitstream position pointer being maximum b+n+1−m, which therefore corresponds to a shift in the bitstream position pointer with maximum n−m+1.

In case the first m-bit set forms part of the n-bit pattern, the first memory contents is a pointer to a second memory location, being a first entry of a linked list. This second memory location contains the following information with respect to the remaining n−m bits to be searched for:

- a head mask pattern, indicating the positions of bits to verify in bits preceding the first m-bit set in the incoming bitstream,
- a head match pattern, containing the values that the bits in the bit positions indicated by the head mask pattern should match with,
- a tail mask pattern, indicating the positions of bits to verify in bits following the first m-bit set in the incoming bitstream,
- a tail match pattern, containing the values that the bits in the bit positions indicated by the tail mask pattern should match with,
- a bit pointer, indicating the relative position of the first m-bit set with respect to the n-bit pattern,
- an error count number, whose value is equal to the total number of bits not matching between the first m-bit set and one matching m-bit subset of the n-bit pattern,
- a marker whose value either has to be considered as a new pointer to a next memory location being the next entry in this linked list, or whose value is the predetermined word, in this case indicating the end of the linked list.

Note that the head and tail mask and match patterns are n−m bits long.

The method uses the head mask pattern to obtain the relevant bit positions preceding the first m-bit set using a logic AND function on the (n−m) bits preceding the first m-bit set AND the (n−m) head mask pattern.

Similarly, the method uses the tail mask pattern to obtain the relevant bit positions following the first m-bit set using a logic AND function on the (n−m) bits following the first m-bit set AND the (n−m) tail mask pattern. Next the relevant preceding and following bit positions are compared with the head and tail match patterns using an EXOR operation. Finally the head and tail errors are calculated as follows:

((n−m)bits preceding m-bit set AND (n−m) head mask pattern)EXOR head match pattern, the result of this operation being a binary word of which the number of bits being equal to one will be counted. The result of this sum is the head error.

((n−m)bits following m-bit set AND (n−m) tail mask pattern) EXOR tail match pattern, the result of this operation being a binary word of which the number of bits being equal to one will be counted. The result of this sum is the tail error.

The error count number is then updated by incrementing the error count number contained within the second memory location with the head and the tail errors. This updated error count number is then compared with the predetermined number of bit errors.

In case this predetermined number of bit errors is not exceeded the n-bit pattern is detected and its position within the bitstream can be determined based on the bitstream position pointer and the bit pointer.

In case the maximum allowed number of errors is exceeded the method will investigate the value of the marker, as contained within the second memory location. If the value of the marker is equal to the predetermined word, thus indicative of the end of the linked list,the complete procedure will start again after first incrementing the bitstream position pointer with maximum n−m+1, and extracting therefrom a new set of m consecutive bits. This new set is treated the same way as the first m-bit set and the steps that were described before on the first m-bit set are repeated on this new set.

If, in contrast, the value of this marker is different from this predetermined word, the marker value is treated as the pointer to a next memory location being the next entry in the linked list.

This next entry contains similar information as already described for the first entry head and tail mask and match patterns, a bit pointer, an error count number and a marker. Nevertheless the value of these entities can be different from that that was contained in the first linked list entry. This new information is treated the same way as described for the information contained in the first entry of the linked list and the steps for updating the error count number and comparing this updated error count number with the predetermined number of bit errors are repeated. The result of this comparison again either indicates that the n-bit pattern is detected or not, in the latter case again leading to the investigation of the marker, which may again either indicate the end of the linked list, or point to a next entry in the linked list on which the above mentioned steps are repeated.

The procedure is best explained into more detail on two examples. In both examples hexadecimal code is used. The framework has a length of 32 bits (n=32), and sets of 16 bits (m=16) are sequentially taken from the bitstream. Note that in the hexadecimal code each code represents 4 bits, the bit pointers are thus increasing with increments of 4 when shifting a hexadecimal code position.

Figure 2A:
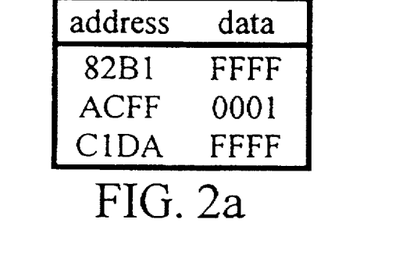
Figure 2B:
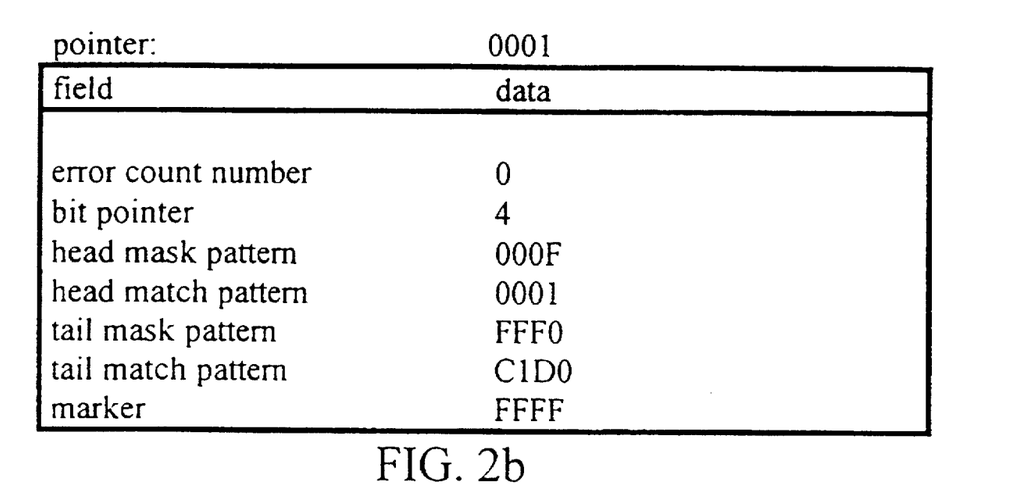

A first example is shown in FIGS. 2a and 2b wherein FIG. 2a shows part of the first memory contents and FIG.2b shows part of the linked list entries, situated at these locations denoted by the pointer value 0001. The 32-bit synchronisation pattern to be found is "1ACFFC1D". The incoming bitstream has the value "82B1ACFFC1DA92". Suppose the predetermined number of bit errors to be 2 and the predetermined word indicating that an m-bit set does not form part of the n-bit pattern or indicating the end of the linked list to be "FFFF". The method starts with initializing the bitstream position pointer to an arbitrary value, in this case being "1", and with taking the first 16 bit set, which has the hexadecimal value "82B1". The method then searches in the table having $2^{16}$ memory locations, at the address 82B1. The contents of this first addressed memory location is the predetermined word, indicating that this 16-bit set does not form part of a set of 16 consecutive bits of the 32-bit pattern, taken into account a maximum allowed error number of 2. This leads to incrementing the bitstream pointer with maximum 32−16+1=17. Because of practical reasons (memory lengths in most computers are multiples of 8) in this example the bitstream pointer will be incremented with 16, causing the next 16-bit set to be considered. This set has the hexadecimal value "ACFF". The method searches again in the table at address ACFF, the contents being different from the predetermined word, and the method consequently treats this as a pointer to a second memory location, being the first entry of a linked list. This second memory location contains an error count number, which has the value 0 since no bit errors are encountered so far after a bit-by-bit comparison of 16-bit set "ACFF" and 16-bit part "ACFF" of the n-bit pattern. The second memory location also contains a bit pointer, its value being 4 since the 16-bit set matches a 16-bit part of the pattern, starting at the fourth position. The second memory location further contains a head mask pattern with value 000F, indicating that only 4 bits preceding the 16-bit set have to be compared, the comparing reference being the head match pattern having the value 0001, as needed to complete the 32-bit pattern. In a similar way the tail mask pattern has the value FFF0, indicating that 12 bits following the 16-bit set have to be compared with the tail match pattern C1D0.

A last information contained within the second memory location is the marker, in this case indicating the end of the linked list. Indeed, there are no other 16-bit words contained within the frameword "1ACFFC1D" that map with "ACFF", or other possibilities based on "ACFF", allowing two bit errors.

The head and tail errors are calculated based on the head and tail mask and match patterns, as described before, and are both 0. They are added to the error count number, which now has an updated value of 0, still being smaller than the predetermined number being 2. This means that the 32 bit pattern is detected, whose position within the bitstream can be reconstructed based on the bitstream position pointer being 16, and the bitpointer being 4.

Figure 3A:
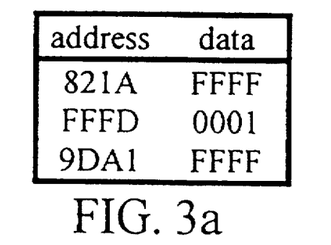
Figure 3B:
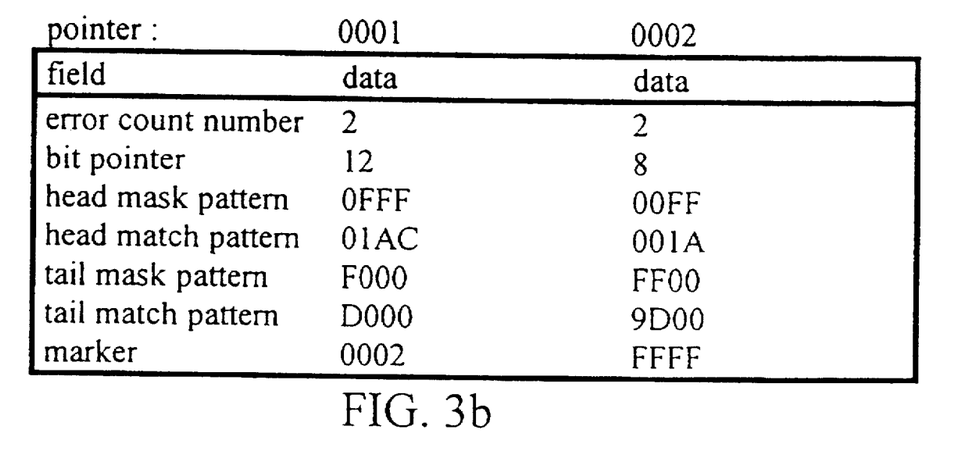

In a second example, depicted by FIGS. 3a and 3b, wherein FIG. 3a represents part of the first memory contents and FIG. 3b shows part of the linked list entries, namely these entries addressed by the pointer values 0001 and 0002. The synchronisation word to be found is "1ACFFD9D". Again 2 bit errors are allowed. The predetermined word indicating that an m-bit set does not form part of the n-bit pattern or indicating the end of the linked list is again denoted by "FFFF". The incoming data stream has the value "821AFFFD9DA1". The method starts again with setting the bitstream position pointer to 1 and with taking the first 16 bit set, which has the hexadecimal value "821A". The method then searches in the table having $2^{16}$ memory locations, at the address 821A. The contents of this addressed memory location is the predetermined word, indicating that this 16-bit set does not form part of a set of 16 consecutive bits of the 32-bit pattern, taken into account a predetermined number of bit errors of 2. This again leads to incrementing the bitstream position pointer with 16, causing the next 16-bit set to be considered. This set has the hexadecimal value "FFFD". The method then searches again in the table at address FFFD, and, since there is a match with a 16-bit subset(FFD9) of the 32-bit pattern taken into account 2 errors, finds information different from the predetermined word, and consequently treats this as a pointer to a second memory location, which is the first entry of a linked list. This second memory location contains an error count value, which now has the value 2 since 2 bit errors are encountered so far after a bit-by-bit comparison of 16-bit set "FFFD" and 16-bit part "FFD9" of the 32-bit pattern. The second memory location further contains a bit pointer, its value being 12 since "FFFD" matches "FFD9", starting at the 12th position of the 32-bit pattern. The second memory location further contains a head mask pattern with value 0FFF, indicating that 12 bits preceding the 16-bit set have to be compared, the comparing reference being the head match pattern having the value 01AC, as needed to complete the 32-bit pattern. In a similar way the tail mask pattern has the value F000, indicating that 4 bits following the 16-bit set have to be compared with the tail match pattern D000.

The marker,as found in this second memory location, is to be considered as a new entry of the linked list. Indeed, in this example there is another 16-bit word contained within the frameword "1ACFFD9D" that maps to the 16-bit set "FFFD" taken into account 2 bit errors maximum, namely "CFFD".

The method continues of course at the first entry of the linked list and calculates head and tail errors. In this case the head error has a value of 7, and the tail error has a value of 1. The updated error count will be 10, being larger than the maximum allowed value of 2. This leads to investigate the marker, in this case being a new entry in the linked list, and the calculation of head and tail error counts starts again. With the new 16-bit part of the 32-bit pattern, namely "CFFD", head and tail errors are 0, the new updated error count number thus being 2, which, in this case means that the 32-bit pattern "1ACFFD9D" is found, starting at position 8 of the second 16-bit set of the incoming bit stream.

For multiple synchronisation the method essentially remains the same. Only the first memory and the linked list will be larger, containing m-bit parts of subsequent synchronisation patterns, and possible combinations taken into account the maximum allowed error number. By a careful construction of the table and of the linked list, whereby the statistically most probable m-bit words and n−m remaining bit parts will be ordered in such a way that the total computing time is as low as possible, considerable savings of computing time can be achieved.

Figure 4:
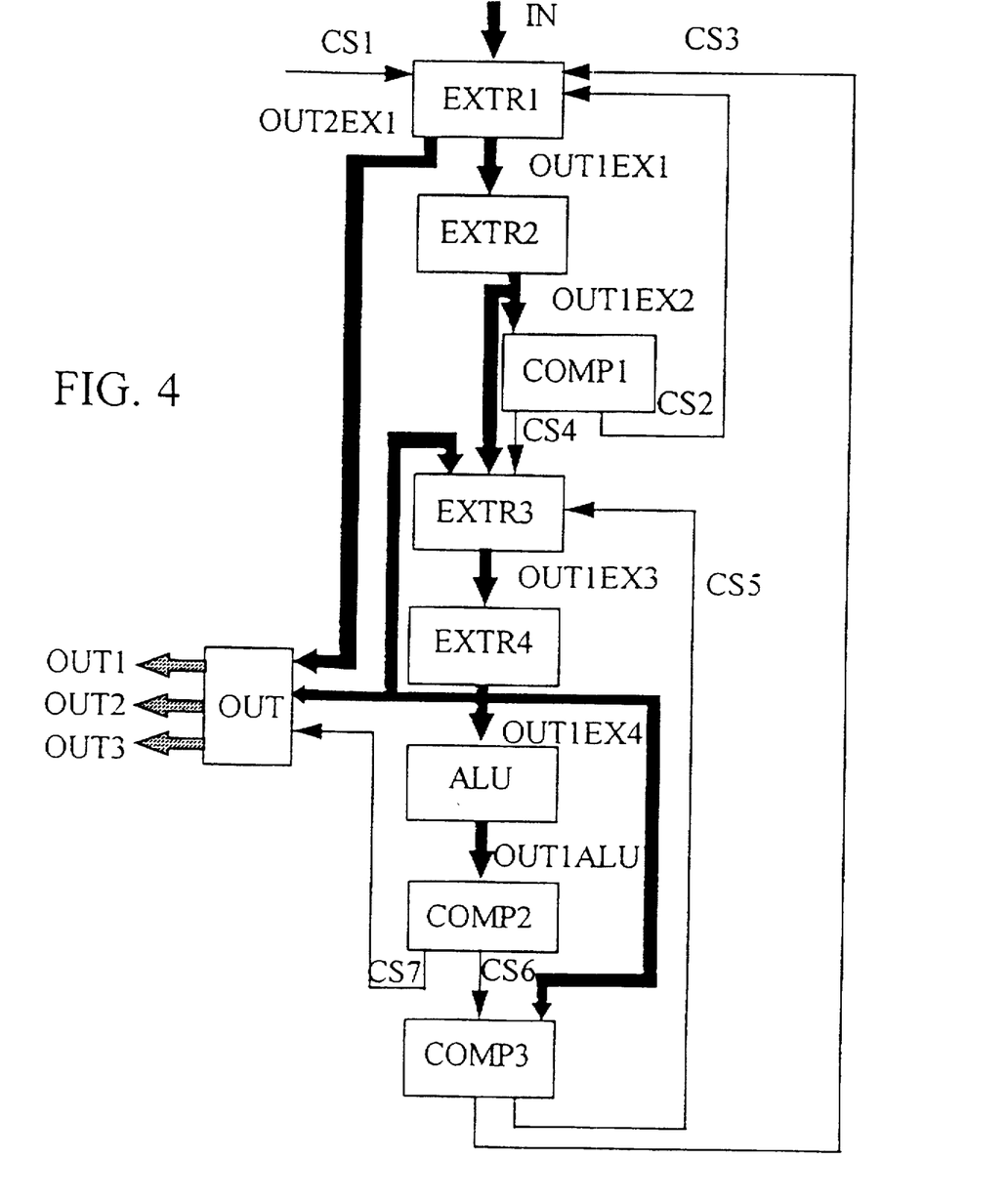
FIG. 4 represents an embodiment realizing the subject method.

In FIG. 4 a possible embodiment realizing the above method is shown. This embodiment includes a first extraction module EXTR1 that receives the incoming bitstream and that is adapted to initialize the value of the bitstream position pointer under control of a first control signal, being CS1. CS1 is an external trigger signal to indicate the start of the above method. EXTR1 is further adapted to store the latest value of the bitstream position pointer and to eventually increment the value of this bitstream position pointer with maximum n−m+1 under control of 2 other control signals, CS2 and CS3. These are generated inside the apparatus. CS1, CS2 and CS3 are active in a mutually exclusive way. CS2 is active if an m-bit set does not form part of the n-bit pattern, whereas CS3 is active if the end of the linked list is detected as was described before for the subject method. EXTR1 is further adapted to extract a set of m consecutive bits from the bitstream starting at a position indicated by the bitstream position pointer. This set of m bits forms a first output signal, OUT1EX1, of EXTR1. The value of the bitstream position pointer forms a second output signal, OUT2EX1, of this first extraction module. The set of m bits serves as the input signal of a second extraction module EXTR2. EXTR2 considers the m-bit set as an address of a location in a first memory being a table such as the one described before for the subject method and extracts the contents of this addressed location in this table. This contents of this location of the first memory is the output signal OUT1EX2 of EXTR2 and serves as the data input signal of a first comparator COMP1. COMP1 compares this with the predetermined word to determine whether the set of m bits forms part of the n-bit pattern. COMP1 has two output control signals: CS2 and CS4. CS2 is active with CS4 being nonactive when the result of the mentioned comparison indicates that the m-bit set does not form part of the n-bit pattern whereas CS4 is active while CS2 is non-active when the m-bit set forms part of the n-bit pattern. CS4 controls a third extraction module EXTR3 together with a fifth control signal CS5. Again CS4 and CS5 are never active simultaneously. The third extraction module receives both the output signal of EXTR2, being the contents of the location in the first memory, as well as the output signal of a next extraction module EXTR4 as a first data input signal and a second data input signal respectively. The function of the extraction module EXTR3 is to determine the pointer to the linked list entry as described above with respect to the subject method. If CS4 is active this pointer is equal to the contents of the location in the first memory whereas if CS5 is active EXTR3 needs to extract the pointer from its second data input signal. The thus extracted pointer is the output signal, OUT1EX3, of EXTR3, and serves as the input signal of the fourth extraction module EXTR4. EXTR4 extracts the information from the linked list entry at the position indicated by this pointer. This information is the input signal of an arithmetic and logic module ALU, that calculates the head and tail errors and the updated error count number as was described above with respect to the subject method. The updated error count number is the output signal, OUT1ALU, of the arithmetic and logic module and serves as the input signal of a second comparator COMP2. The function of this comparator is to compare this updated error count number with the predetermined number of bit errors. COMP2 has two output signals: CS6 being active when the predetermined number of errors is exceeded whereas CS7 is active when this predetermined number of bit errors is not exceeded. Again from the exclusive nature of this comparison it follows that CS6 and CS7 are never simultaneously active. CS7 is a control signal for an output module OUT having OUT1EX4 and OUT2EX1 as a first input data signal and a second input data signal respectively. This output module has the following function: upon control of CS7 it generates a first output signal, OUT1, that indicates whether the n-bit pattern was found, a second output signal, OUT2, that constitutes the latest value of the bitstream position pointer, as was obtained by OUT1EX4, and a third output signal, OUT3, that constitutes the value of the bit pointer as contained within the output signal OUT1EX4 from the fourth extraction module, if CS7 is not active the first output signal OUT1, which is also a first output signal of the embodiment indicates that the n-bit pattern is not yet detected, whereas the second and the third output signals that are also a second and a third output signal of the embodiment should not be considered to contain relevant information.

CS6 serves as a control signal to a next comparator COMP3 that receives OUT1EX4 as a data input signal, that extracts therefrom the marker data, and that checks whether this marker indicates or not the end of the linked list by comparing this marker data with the predetermined word indicating the end of the linked list. COMP3 has two output control signals: CS5 and CS3 that were already mentioned earlier. CS5 is active if the marker value as extracted by COMP3 is not indicative of the end of the linked list. CS3 is active if the marker data is indicative of the end of the linked list, and will control EXTR1 to increment the value of the bitstream position pointer. Nevertheless COMP3 only performs these functions upon activity of the CS6 control signal, if CS6 is not active the output control signals of COMP3 are not active too.

The timing of these control signals will not be described here, but it is evident that a person skilled in the art has the knowledge to provide appropriate delays for separating the time allocated for these control signals to be active.

It further needs to be remarked that this embodiment can be realized both by means of a software or a hardware implementation.

While the principles of the invention have been described above in connection with specific apparatus, it is to be clearly understood that this description is made only by way of example and not as a limitation on the scope of the invention.

What is claimed is:

1. A frame synchronization method including the detection of an n-bit pattern with predetermined characteristics in a bitstream, the steps of: extracting a first set of m bits, with m being smaller than or equal to n, from a first position in said bitstream, deriving from said first set an address of a location in a first memory, deriving from the contents of said location in said first memory at least one second position in said bitstream and at least one second set of bits to be extracted therefrom until said n-bit pattern is detected in said bitstream.

2. A frame synchronization method according to claim 1, wherein:

said m bits are consecutive bits of said bitstream, constituting a first m-bit set, and said first m-bit set forms part of said n-bit pattern if there exists at least one subset of m consecutive bits contained within said n-bit pattern for which a bit-by-bit comparison of said first m-bit set with said subset of m consecutive bits contained within said n-bit pattern does not result in a number of bit errors exceeding a predetermined number of bit errors, and when said first m-bit set forms part of said n-bit pattern bits, said contents of said location in said first memory includes a first pointer to a second memory location being a first entry of a linked list, said second memory location including information relative to the remaining n–m bits of the n-bit pattern to be detected into said bitstream, and when said first m-bit set does not form part of said n-bit pattern, said second position is equal to said first position in said bitstream shifted by maximum n–m+1 bits, and said steps as specified in claim 1 are repeated with said second position in said bitstream as said first position in said bitstream and while said m bits are consecutive bits.

3. A frame synchronization method according to claim 2, wherein:

said information further includes:
(a) a bit pointer indicating the relative position of said first m-bit set with respect to said n-bit pattern,
(b) at least one set of bit positions and
(c) at least one set of bit values.

4. A frame synchronization method according to claim 3, wherein:

said information further includes
(a) a first set of bit positions,
(b) a second set of bit positions,
(c) a first set of bit values and (d) a second set of bit values, and wherein said first set of bit positions is a head mask pattern indicating which bit positions to verify in bits preceding said first m-bit set in said bitstream, and said second set of bit positions is a tail mask pattern indicating which bit positions to verify in bits following said first m-bit set in said bitstream, said first set of bit values being a head match pattern and said second set of bit values being a tail match pattern.

5. A frame synchronization method according to claim 2, wherein said information further includes:
an error count number whose value is equal to the total number of bits not matching between said first m-bit set and said subset of in consecutive bits contained within said n-bit pattern, and a marker whose value either has to be considered as a new pointer to a next memory location being a next entry in said linked list, or as an indication of the end of said linked list.

6. A frame synchronization method according to claim 5, wherein said information is used:
to calculate a head error being equal to the number of bits not matching between said head match pattern and bits in said bitstream corresponding to the positions as specified by the head mask pattern; and
to calculate a tail error being equal to the number of bits not matching between said tail match pattern and bits in said bitstream corresponding to the positions as specified by the tail mask pattern, and
wherein an updated error count number is calculated as said error count number incremented with said head error and said tail error.

7. A frame synchronization method according to claim 6, wherein when said updated error count number does not exceed said predetermined number of bit errors, said n-bit pattern is detected, and when said updated error count number exceeds said predetermined number of bit errors, the value of said marker is investigated, whereby
in case the value of said marker indicates the end of said linked list, the steps according to claim 1 are repeated while said first position in said bitstream is shifted by maximum n−m+1 bits and while said m-bits are consecutive bits, and
in case the value of said marker is to be considered as a new pointer to a next memory location, said next memory location containing new information including a new bit pointer, at least one new set of bit positions including a new head mask pattern and a new tail mask pattern, at least one new set of bit values including a new head match pattern and a new tail match pattern, a new error count number and a new marker, the steps of claim 6 and of this claim then being repeated with;
said new error count number as said error count number, said new bit pointer as said bit pointer, said new set of bit positions as said set of bit positions, said new head mask pattern as said head mask pattern, said new tail mask pattern as said tail mask pattern, said new set of bit values as said set of bit values, said new head match pattern as said head match pattern, said new tail match pattern as said tail match pattern and said new marker as said marker.

8. A frame synchronization method according to claim 7, wherein in case said n-bit pattern is detected, the position of said n-bit pattern in said bitstream is determined based on
(a) said first position in said bitstream and
(b) said bit pointer.

9. An apparatus for frame synchronization which frame synchronization includes (a) the detection of an n-bit pattern with predetermined characteristics in a bitstream and (b) the generation of at least one output signal upon the detection of said n-bit pattern, wherein said apparatus includes at least one extraction module that is adapted to:

receive at least one input signal to which said bitstream can be applied, determine a first position in said bitstream, extract a set of m bits from said first position in said bitstream, derive from said first set an address of a location in a first memory, derive from the contents of said location in said first memory at least one second position in said bitstream and at least one second set of bits to be extracted therefrom;

at least one comparator module and at least one arithmetic and logic module that are adapted to execute the operations necessary to identify said n-bit pattern in said bitstream.

10. An apparatus for frame synchronization which frame synchronization includes (a) the detection of an n-bit pattern with predetermined characteristics in a bitstream and
(b) the generation of at least one output signal upon the detection of said n-bit pattern, said apparatus including
a first extraction module (EXTR1),
a second extraction module (EXTR2),
a third extraction module (EXTR3),
a fourth extraction module (EXTR4),
a first comparator module (COMP1),
a second comparator module (COMP2),
a third comparator module (COMP3),
an arithmetic and logic module (ALU), and
an output module (OUT), with the following respective functions:
said first extraction module (EXTR1) is adapted to:
receive an input signal (IN), being an input signal of said apparatus to which said bitstream can be applied;
initialize the value of a bitstream position pointer under control of a first (CS1) control signal,
store the value of said bitstream position pointer and increment the value of said bitstream position pointer under control of a second (CS2) and a third (CS3)control signal,
extract a set of m bits of said bitstream starting at a position indicated by said bitstream position pointer,
output a first output signal (OUT1EX1) constituting said set of m bits and a second output signal (OUT2EX1) constituting the value of said bitstream position pointer;
said second extraction module (EXTR2) is adapted to:
consider said set of m bits as an address of a location in a first memory;

extract the contents of said location in said first memory, output an output signal (OUT1EX2) constituting said contents of said location in said first memory;

said first comparator (COMP1) is adapted to:

compare said contents of said location in said first memory against a predetermined word, compare a first output signal of said first comparator constituting said second control signal (CS2) against a second output signal of said first comparator constituting a fourth control signal (CS4);

said third extraction module (EXTR3) is adapted to:

receive a first set and a second set of data input signals, said first set of data input signals constituting said contents of said location in said first memory, said second set of data input signals constituting an output signal (OUT1EX4) of said fourth extraction module (EXTR4);

determine, upon control of said fourth control signal (CS4) and a fifth control signal (CS5), a first pointer to a second memory location; and output an output signal (OUT1EX3) of said third extraction module constituting said first pointer to said second memory location;

said fourth extraction module (EXTR4) is adapted to:

receive said first pointer to said second memory location and to extract therefrom information contained within said second memory location, and to output an output signal (OUT1EX4) of said fourth extraction module constituting said information contained within said second memory location;

said arithmetic and logic module (ALU) is adapted to receive said information contained within said second memory location and to further determine therefrom an error count number, and to output an output signal (OUT1ALU) of said arithmetic and logic module constituting said error count number, said second comparator (COMP2) is adapted to:

verify whether said error count number exceeds a predetermined number of bit errors, to output a first output signal constituting a sixth control signal (CS6) and a second output signal constituting a seventh control signal (CS7);

said third comparator (COMP3) is adapted to:

investigate said information contained within said second memory location, under control of said sixth control signal (CS6), and to output a first output signal constituting said third control signal (CS3), a second output signal constituting said fifth control signal (CS5);

and wherein said output module (OUT) is adapted to:

operate under control of said seventh control signal (CS7); and further receive said bitstream position pointer and said information contained within said second memory location, indicate, by means of a first output signal (OUT1) being a first output signal of said apparatus, whether said n-bit pattern is detected or not, generate a second output signal (OUT2) being a second output signal of said apparatus and constituting the value of said bitstream position pointer, and to generate a third output signal (OUT3) being said third apparatus output signal (OUT3) and constituting part of said information contained within said second memory location.

* * * * *